(12) United States Patent
Ochi et al.

(10) Patent No.: US 7,454,769 B2
(45) Date of Patent: Nov. 18, 2008

(54) OPTICAL PICKUP APPARATUS

(75) Inventors: Manabu Ochi, Fujisawa (JP); Hiroshi Ogasawara, Yokohama (JP); Hirofumi Taguchi, Yokohama (JP); Seiichi Katou, Tsuchiura (JP)

(73) Assignees: Hitachi, Ltd., Tokyo (JP); Hitachi Media Electronics Co., Ltd., Mizusawa-shi, Iwate-ken (JP)

( * ) Notice: Subject to any disclaimer, the term of this patent is extended or adjusted under 35 U.S.C. 154(b) by 460 days.

(21) Appl. No.: 10/953,257

(22) Filed: Sep. 28, 2004

(65) Prior Publication Data
US 2005/0086677 A1 Apr. 21, 2005

(30) Foreign Application Priority Data
Oct. 21, 2003 (JP) .............................. 2003-360665

(51) Int. Cl.
*G11B 7/08* (2006.01)
(52) U.S. Cl. ................................... 720/673
(58) Field of Classification Search ............... None
See application file for complete search history.

(56) References Cited

U.S. PATENT DOCUMENTS 6,871,351 B2 * 3/2005 Yamauchi et al. .......... 720/671
7,400,568 B2 * 7/2008 Katou et al. ............... 369/121
2005/0286581 A1 * 12/2005 Shinohara et al. ......... 372/43.01

FOREIGN PATENT DOCUMENTS

| JP | 05-81693 A | 4/1993 |
| JP | 2002-250408 | 9/2002 |
| JP | 2002-304758 | 10/2002 |

OTHER PUBLICATIONS

U.S. Appl. No. 09/928,346.
U.S. Appl. No. 10/722,482.

* cited by examiner

Primary Examiner—Joseph Feild
Assistant Examiner—Parul Gupta
(74) Attorney, Agent, or Firm—Townsend and Townsend and Crew LLP

(57) ABSTRACT

An optical pickup apparatus comprises a laser beam source to generate laser beam, and a laser driving circuit to drive the laser beam source. The laser driving circuit is connected to a flexible substrate and arranged in a groove or hole provided in the vicinity of that portion of an optical pickup housing, to which the laser beam source is fixed. The laser driving circuit is connected through a heat conduction member to an upper cover among upper and lower covers, the upper cover being close to the laser driving circuit. Thereby, heat generated from the laser driving circuit is conducted through the heat conduction member to the upper cover to be transferred outside the optical pickup apparatus while being scattered in an inplane direction of the upper cover.

2 Claims, 6 Drawing Sheets

INNER PERIPHERAL SIDE ← → OUTER PERIPHERAL SIDE

OPTICAL PICKUP APPARATUS

INCORPORATION BY REFERENCE

The present application claims priority from Japanese Application JP2003-360665 filed on Oct. 21, 2003, the content of which is hereby incorporated by reference into this application.

BACKGROUND OF THE INVENTION

The present invention relates to an optical pickup apparatus, which records and/or reproduces information on a disk and in which a plurality of laser beam sources to emit laser beams are supported on a pickup housing. More specifically, the present invention relates to a cooling mechanism for the optical pickup apparatus.

Common optical pickup apparatuses comprise laser beam sources to emit laser beams, optical parts to branch laser beams from the laser beam sources and to condense laser beams on optical disks, and an optical detector to receive reflected laser beams from the optical disks. When a signal is detected in an optical pickup apparatus, positions, in which the laser beam sources, the optical parts, and the optical detector are fixed, are important. In order to exactly perform recording and reproducing operations, it is necessary to perform adjustment to such fixed positions with accuracy.

Optical disks include CDs and DVDs, which are different from each other in wavelength of using laser beams and it has been desired that one optical pickup apparatus can use the both optical disks. Therefore, there is a need for an increase in degree of freedom of respective parts in directions of adjustment in addition to accuracies, with which laser beam sources, an optical detector, and optical parts are adjusted to fixed positions. Further, a laser driving circuit, a high-frequency module, an optical detector, a driving coil used in an objective lens driving device, etc. are also mounted on the optical pickup apparatus as parts, which generate heat at the time of recording/reproduction, in addition to laser beam sources. In this manner, many heat generating parts are mounted on optical pickup apparatuses, so that temperature rises due to generation of heat from such heat generating parts.

In particular, with a recording type optical pickup apparatus for recording of information on a disk such as DVD-RAM/R/RW, CD-R/RW, etc., much heat is generated from laser beam sources provided in the optical pickup apparatus and a laser driving circuit for driving of the laser beam sources. Further, the higher the recording speed, the more necessary high-output laser beam sources, and it is required that the laser beam sources and a laser driving circuit be arranged close to each other. On the other hand, optical pickup apparatuses tend to be made small-sized and thin. Therefore, generation of heat is liable to cause parts to undergo degradation in performance, deterioration in service life, malfunction, or the like.

In order to cope with such problems caused by generation of heat, for example, JP-A-2002-304758 discloses an optical pickup apparatus including a laser driving circuit arranged in the vicinity of laser beam sources to generate heat, the optical pickup apparatus being constructed such that a surface of the laser driving circuit opposed to a surface thereof facing a flexible substrate is put into close contact with and thermally connected with an optical pickup housing so as to dissipate heat generated from electronic parts to the optical pickup housing. With such optical pickup apparatus, it is insisted that it is possible to reduce heat resistance between the laser driving circuit arranged in the vicinity of the laser beam sources and the optical pickup housing and to effectively dissipate the heat generated from the laser driving circuit to the optical pickup housing.

Also, JP-A-2002-252408 discloses a construction, in which a heat sink is mounted on a housing, a side of a laser driver opposed to that surface thereof, to which a flexible substrate is connected, is brought into close contact with the heat sink, the heat sink is installed below the laser driver, and the flexible substrate is arranged above the laser driver.

However, with the respective conventional techniques described above, an object, to which heat generated from laser beam sources and a laser driving circuit is to be conducted, is an optical pickup housing. Therefore, in the case where both the laser beam sources and the laser driving circuit are close to each other, heat generated from the laser driving circuit is conducted to the laser beam sources through the optical pickup housing to have a possible influence on the performance and service life of the laser beam sources.

Also, in order that an optical pickup apparatus exactly perform recording/reproduction for a plurality of types of optical disks, it is necessary to adjust and position laser beam sources, an optical detector, and optical parts, respectively, in plural directions of translation and rotation. Therefore, the respective parts are not necessarily fixed to an optical pickup housing in a state of contact with the same but fixed thereto by an adhesive with a distance of several hundreds of μm to several mm therefrom. In particular, in the case where laser beam sources are connected to an optical pickup housing only by means of a small member, such as adhesive, having a coefficient of thermal conductivity of less than 1.0 W/m/K, there is a possibility that the laser beam sources becomes high temperature to have an influence on the performance and service life of the laser beam sources.

BRIEF SUMMARY OF THE INVENTION

The invention has been thought of in view of such actual circumstances in the prior art, and has its object to provide an optical pickup apparatus having a high accuracy, with which laser beam sources, an optical detector, and optical parts are adjusted to fixed positions, and a high degree of freedom in directions, in which respective parts are adjusted.

Also, it is another object of the invention to provide an optical pickup apparatus, which prevents laser beam sources and a laser driving circuit from undergoing degradation in performance, deterioration in service life, and malfunction, and which is high in reliability.

In order to attain the above objects, the invention provides an optical pickup apparatus comprising first and second fixing members, which hold and fix laser beam sources to an optical pickup housing, and wherein opposed surfaces of the first and second fixing members are formed to define curved surfaces having substantially the same radius and related to each other in a concave-convex manner. In this case, a cooling path of the laser driving circuit is formed directly in an upper cover or a lower cover without the medium of the pickup housing. Therefore, the laser driving circuit is interposed between the upper and lower covers without the medium of the optical pickup housing. It is preferred that the laser driving circuit is arranged toward an inner peripheral side of a disk relative to positions, from which all the laser beam sources emit beams, in a state, in which an operation of recording information on a disk or reproducing information from the disk is performed, and that portion of the upper cover or the lower cover, to which the laser driving circuit is connected, is cut off over a larger area than a projected area of the laser beam sources. Further, connections of the upper cover or the lower cover, to which the laser driving circuit is connected, and the optical pickup housing are not positioned in that portion of sides of the upper cover or the lower cover, which extends between the laser beam sources and the laser driving circuit.

Concretely, in an optical pickup apparatus, which records and/or reproduces information on a disk being a recording medium and in which laser beam sources to emit laser beams are supported on a pickup housing, a plurality of fixing members are used to fix the laser beam sources to the pickup housing, and two opposed surfaces of adjoining fixing members among the plurality of fixing members are formed to define curved surfaces capable of mutual surface contact with each other.

Preferably, with such arrangement, one of the curved surfaces is formed to provide a cylindrical-shaped side surface, the other of the curved surfaces is formed to provide a concave-shaped surface, which comes into surface contact with the cylindrical-shaped side surface, and the laser beam sources are provided in plural.

In another feature to attain the above objects, there is provided an optical pickup apparatus, which records and/or reproduces information on a disk being a recording medium, comprising a plurality of laser beam sources to emit laser beams, a laser driving circuit to drive and control the laser beam sources, an optical pickup housing to accommodate therein the laser beam sources and the laser driving circuit, and upper and lower covers, respectively, provided on upper and lower surfaces of the optical pickup housing, and wherein the laser driving circuit is arranged inside the optical pickup housing and toward an inner peripheral side of the disk relative to positions, from which the laser beam sources emit beams, one of the upper and lower covers is mounted to the optical pickup housing with a predetermined air gap therebetween, and the laser driving circuit is fixed to that cover, to which the laser driving circuit is mounted with the air gap therebetween, in a state, in which thermal conductivity is ensured.

In this feature, the laser driving circuit may be thermally connected to the other of the covers, and that cover, to which the laser driving circuit is mounted with the air gap therebetween, is preferably cut off at least in positions opposed to the laser beam sources and provided in a position not to hinder cooling of the laser beam sources. Further, those connections of the cover and the optical pickup housing, which are mounted to the optical pickup housing with the air gap therebetween, are provided at least outside lines, which connect between the laser driving circuit and the plurality of laser beam sources.

Other objects, features and advantages of the invention will become apparent from the following description of the embodiments of the invention taken in conjunction with the accompanying drawings.

DETAILED DESCRIPTION OF THE INVENTION

Embodiments of the invention will be described below with reference to the drawings.

Figure 6:
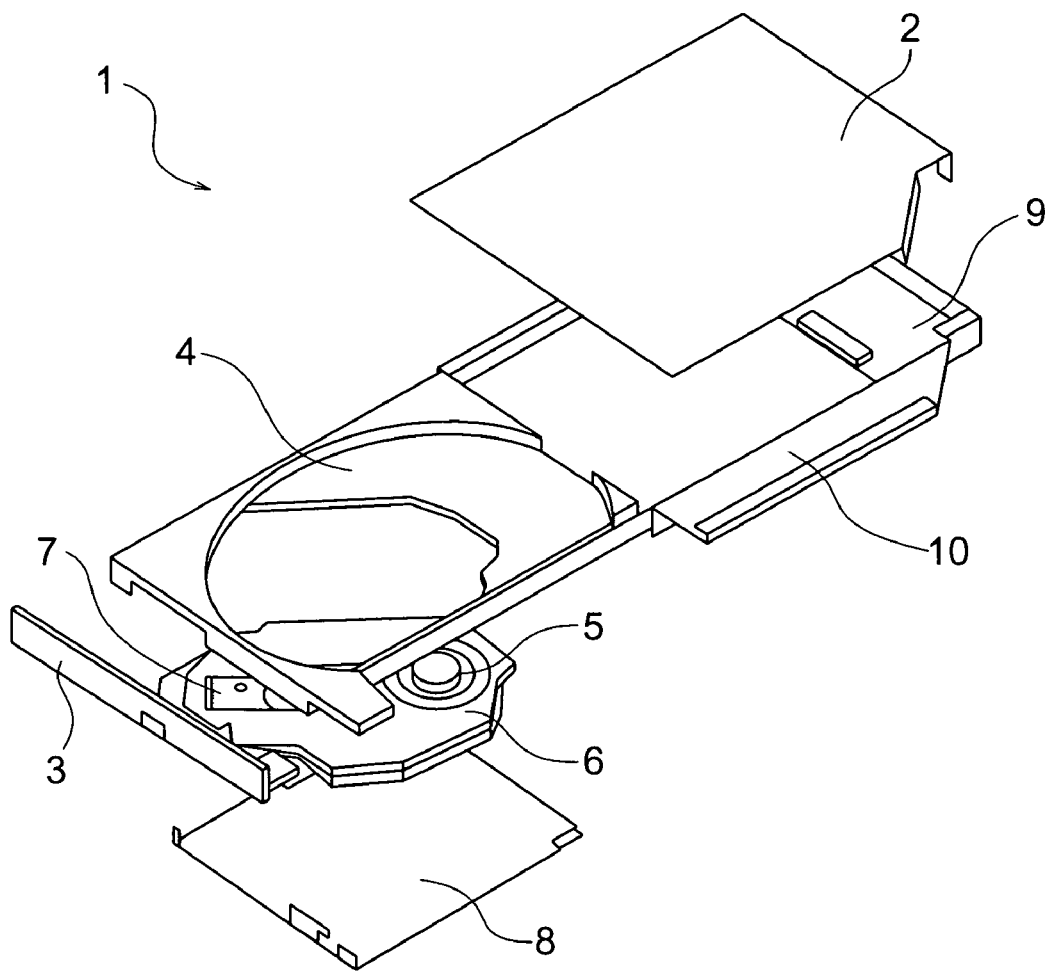
FIG. 6 is an exploded, perspective view showing an optical disk apparatus comprising the first embodiment of the optical pickup apparatus of the invention shown in FIG. 1.

FIG. 6 is an exploded, perspective view showing an optical disk apparatus using a first embodiment of an optical pickup apparatus according to the invention. In the drawing, the optical disk apparatus 1 mainly comprises an apparatus body 10, a disk tray 4 for carrying-in and carrying-out of a disk, which constitutes an information recording medium, from the apparatus, and a circuit substrate 9 mounting thereon semiconductor parts to perform control of drive of and signal processing of electronic parts provided in the optical disk apparatus 1. A top cover 2 and a front cover 3, respectively, are provided on an upper surface and a front surface of the apparatus body 10 to cover the upper and front surfaces of the apparatus body.

Mounted to the disk tray 4 is a unitary mechanism (referred below to as unit mechanism) 6, an underside of which is covered by a bottom cover 8. Mounted on the unit mechanism 6 is a spindle motor 5 for rotating a disk, a recording or reproducing, or reproducing exclusive optical pickup 7 for recording and/or reproducing information from the disk, and an optical pickup feed mechanism comprising a feed motor and the like for moving the optical pickup 7 along a guide shaft (not shown) in a radial direction of the disk.

Figure 7:
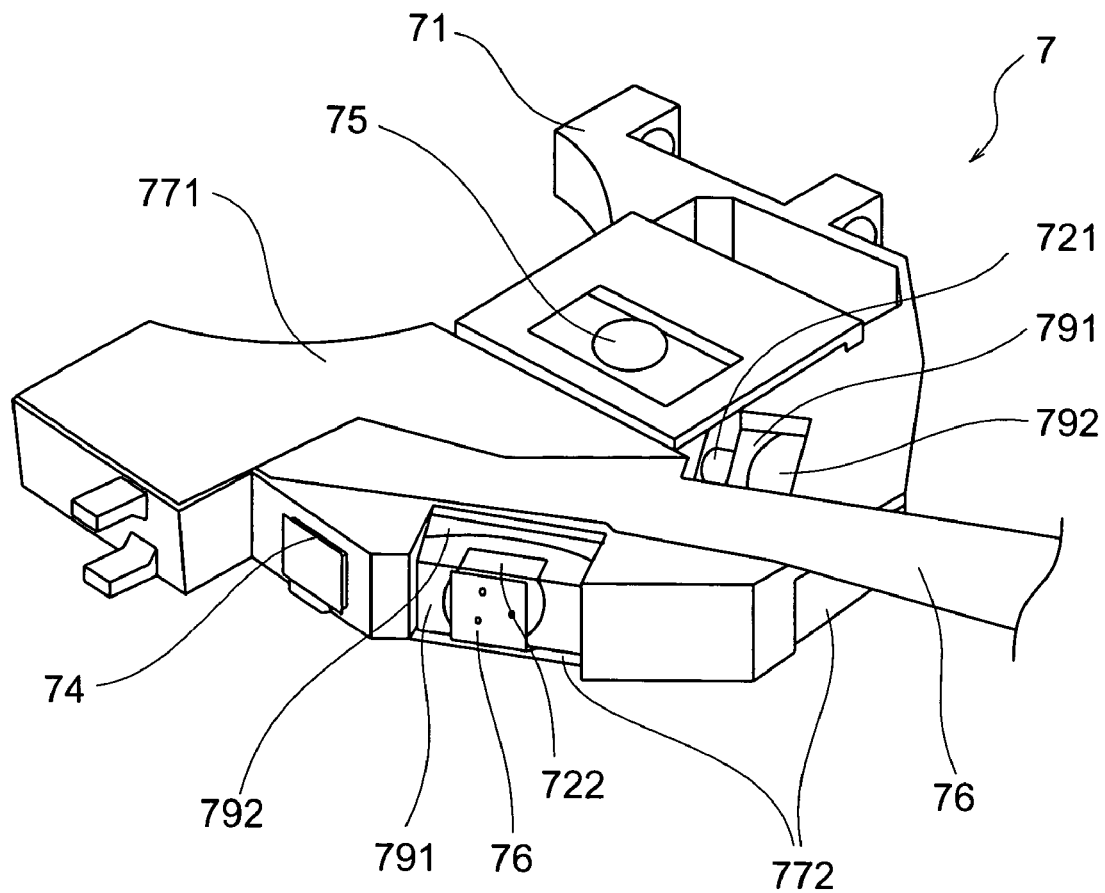
FIG. 7 is a perspective view showing a second embodiment of an optical pickup apparatus according to the invention.

FIG. 7 is a perspective view showing details of the optical pickup 7. The optical pickup 7 comprises a first laser beam source 721 to emit a laser beam having a first wavelength, a second laser beam source 722 to emit laser beam having a second wavelength, a laser driving circuit to drive and control the laser beam sources 721, 722, a front monitor to monitor outputs of the laser beam sources 721, 722, optical parts such as prism, mirror, lens, etc. for conducting the laser beams to the disk, an objective-lens drive device 75 provided with an objective lens to concentrate the laser beams to accurately form a focal point in a predetermined position on an information recording surface of the disk, an optical detector 74 to convert a change in reflected laser beams from the disk into an electric signal, a flexible substrate 76, which connects the circuit substrate 9 to optical parts mounted on the optical pickup 7 to input/output a signal, and an optical pickup housing 71 mounting thereon the parts described above. Upper and lower surfaces of the optical pickup housing 71 are covered by an upper cover 771 and a lower cover 772 for the purpose of holding the flexible substrate 76 and blocking out electromagnetic waves with respect to the electronic parts.

Those parts, which generate heat at the time of recording or reproduction, among parts mounted on the optical pickup 7 include a driving coil mounted to the objective-lens drive device 75, the laser beam sources 721, 722, the laser driving circuit, the front monitor, the optical detector 74, and the like. Among these parts, the laser beam sources 721, 722 and the laser driving circuit 73 (see FIGS. 1 and 2) are arranged close to each other. The reference numeral 791 denotes a first fixing member, and the reference numeral 792 denotes a second fixing member.

Figure 2:
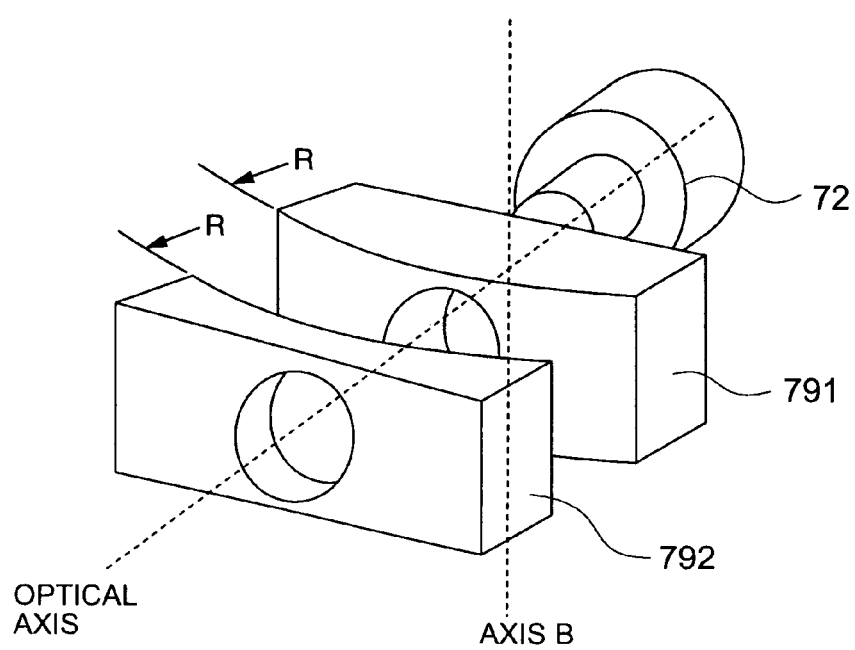
FIG. 2 is an exploded, perspective view showing the laser beam source and fixing members for the first embodiment.
Figure 3:
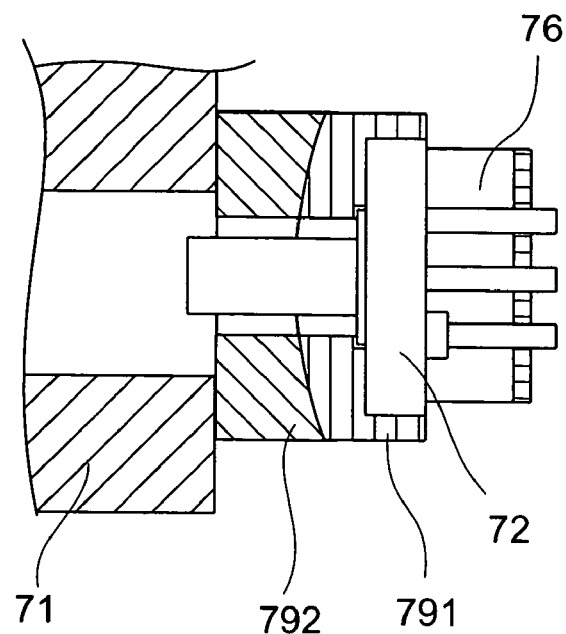
FIG. 3 is a cross sectional view showing a portion, to which the laser beam source is mounted, in the first embodiment.

FIG. 2 is a perspective view showing the relationship between the laser beam source and the first and second fixing members, and FIG. 3 is a cross sectional view showing a state, in which the laser beam source is mounted to the optical pickup housing 71 by means of the first and second fixing members. A mounting construction of the laser beam sources 721, 722 and a cooling path will be described below with reference to FIGS. 2 and 3.

The laser beam source 72 is first press-fitted into or brought into surface contact with the first fixing member 791 made of metal to be adhesively fixed thereto. Subsequently, the first fixing member 791 is brought into surface contact with the second fixing member 792 made of metal to be fixed thereto. Then, the second fixing member 792 is brought into surface contact with the optical pickup housing 71 to be fixed thereto by an adhesive. By convexly (cylindrical-shaped) curving the first fixing member 791 to have a radius R, and concavely curving the second fixing member 792 to have a radius R, connection surfaces of the first fixing member 791 and the second fixing member 792 are shaped to be surface-slidable relative to each other, whereby the first fixing member 791 and the second fixing member 792 can be kept in a state of surface contact as shown in FIG. 3 even in the case where the laser beam source 72 is rotatingly adjusted about an axis (an axis B in FIG. 2) perpendicular to an optical axis. Accordingly, heat generated from the laser beam source 72 is efficiently scattered to the first fixing member 791 and the second fixing member 792, and then to the optical pickup housing 71 to be transferred outside the optical pickup apparatus 7, so that the temperature of the laser beam source 72 can be restricted.

Figure 4:
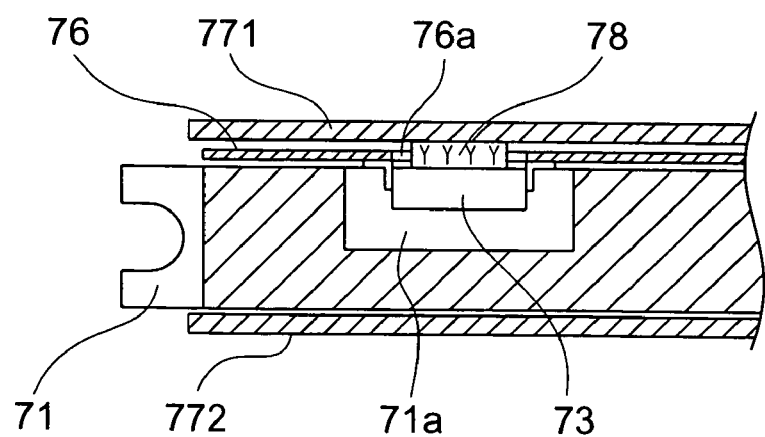
FIG. 4 is a cross sectional view of a portion, to which the laser driving circuit is mounted, in the first embodiment.

FIG. 4 is a cross sectional view of a portion of the optical pickup apparatus, to which the laser driving circuit is mounted. The laser driving circuit 73 is connected to the flexible substrate 76 and arranged in a groove or hole 71a provided in the vicinity of that portion of the optical pickup housing 71, to which the laser beam sources 721, 722 are fixed. The laser driving circuit 73 is connected through a heat conduction member 78 to the upper cover 771 among the upper and lower covers 771, 772, which is disposed near to the laser driving circuit 73. Thereby, heat generated from the laser driving circuit 73 is conducted to the upper cover 771 via the heat conduction member 78 to be transferred outside the optical pickup apparatus 7 while being scattered in an inplane direction of the upper cover 771. Further, since the laser driving circuit is connected to the near upper cover 771 among the upper and lower covers, heat resistance between the laser driving circuit 73 and the cover is restricted to a small magnitude and so temperature of the laser driving circuit 73 can be restricted to be low.

In the case where the flexible substrate 76 is arranged between the laser driving circuit 73 and the upper cover 771, a through-hole 76a is provided in the flexible substrate 76 to permit the laser driving circuit 73 and the upper cover 771 to be connected to each other only through the heat conduction member 78 without the medium of the flexible substrate 76. Thereby, since contact heat resistance can be decreased as compared with the case where the laser driving circuit 73 and the upper cover 771 are connected to each other through the flexible substrate 76, temperature of the laser driving circuit 73 can be restricted to be low. Used for the heat conduction member 78 is a resin material containing a metallic filler, a silicone resin, etc. having a coefficient of thermal conductivity of 1.0 W/m/K or more.

The flexible substrate 76 connects between the laser beam sources 721, 722 and the laser driving circuit 73, and the flexible substrate 76 is present between the upper cover 771 and the optical pickup housing 71. The flexible substrate 76 is as small as 0.10 mm or less in thickness and an amount of heat conducted in the flexible substrate 76 is minute. Accordingly, heat generated from the laser driving circuit 73 is transferred outside through the heat conduction member 78 and the upper cover 771 or the lower cover 772 but is not conducted through the optical pickup housing 71 to the laser beam sources 72, so that temperature of the laser beam sources 721, 722 can be restricted to be low.

Figure 1:
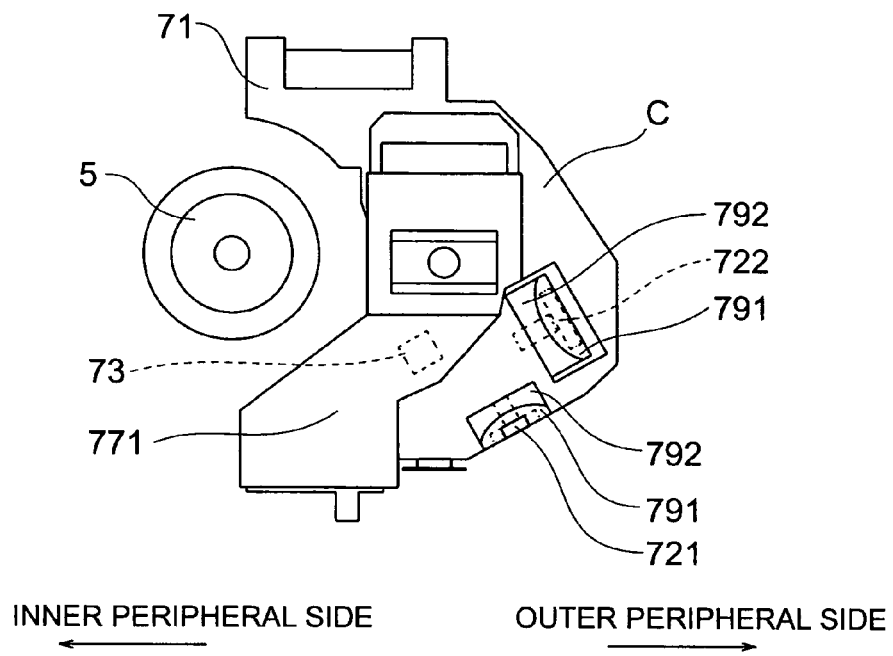
FIG. 1 is a plan view of a first embodiment of an optical pickup apparatus according to the invention, showing a positional relationship between a laser driving circuit and laser beam sources.

FIG. 1 is a plan view showing relationship between the optical pickup housing 71 and the spindle motor 5. According to this embodiment, the spindle motor 5 is arranged toward an inner periphery side of the disk, which is a recording medium, as viewed from the optical pickup apparatus 7 in a state, in which the optical pickup apparatus 7 is mounted on the optical disk apparatus. Conversely, as viewed from the optical pickup apparatus 7, a direction going away from the spindle motor 5 is an outer periphery side of the disk. In order to control the plurality of laser beam sources 721, 722 at high speed, it is required that the laser driving circuit 73 be arranged equally distant from and in the vicinity of the laser beam sources 721, 722. According to this embodiment, the laser driving circuit 73 is arranged equally distant from and on the inner peripheral side of the two laser beam sources 721, 722. Thereby, as compared with the case where the laser driving circuit 73 is arranged on that outer peripheral side of the laser beam sources 721, 722, on which little space can be ensured due to limitations in outside dimension, a wide area of the upper cover 771, which serves as a cooling member for the laser driving circuit 73, can be ensured in a position distant from the laser beam sources 721, 722, so that temperature of the laser driving circuit 73 can be restricted to be low.

The upper cover 771, to which the laser driving circuit 73 is connected, is cut off over a larger area than a projected area of the laser beam sources 721, 722 and their fixing members 791, 792 so that when the upper cover is fixed to the optical pickup housing 71, it does not overlap to external shapes of the laser beam sources 721, 722. In other words, the upper cover 771 is not provided above the laser beam sources 721, 722 and their fixing members 791, 792. Such cut-off portion is indicated by a character C in FIGS. 1 and 2. Accordingly, cooling of the laser beam sources 721, 722 is not hindered by the upper cover 771, which has been raised in temperature by heat generated from the laser driving circuit 73, so that the laser beam sources 721, 722 can be restricted to be low in temperature. However, the flexible substrate 76 must be held down by the covers 771, 772 so as not to come up to touch the disk or the like. Hereupon, according to the present embodiment, the flexible substrate 76 disposed between the laser driving circuit 73 and the laser beam sources 721, 722 is arranged on an underside of the optical pickup housing 71 as shown in FIG. 7 so that it is not arranged in the cut-off portion C of the upper cover 771 above the laser beam sources 721, 722. That is, that end of the flexible substrate 76, which is connected to the second laser beam source 722, is bent upward from the underside of the optical pickup housing 71 to extend to a joining terminal portion of the second laser beam source to be connected to the terminal. In this manner, since the flexible substrate 76 disposed between the laser driving circuit 73 and the laser beam sources 721, 722 is held down by the optical pickup housing 71 and the lower cover 772, the flexible substrate 76 will not come up.

Figure 5:
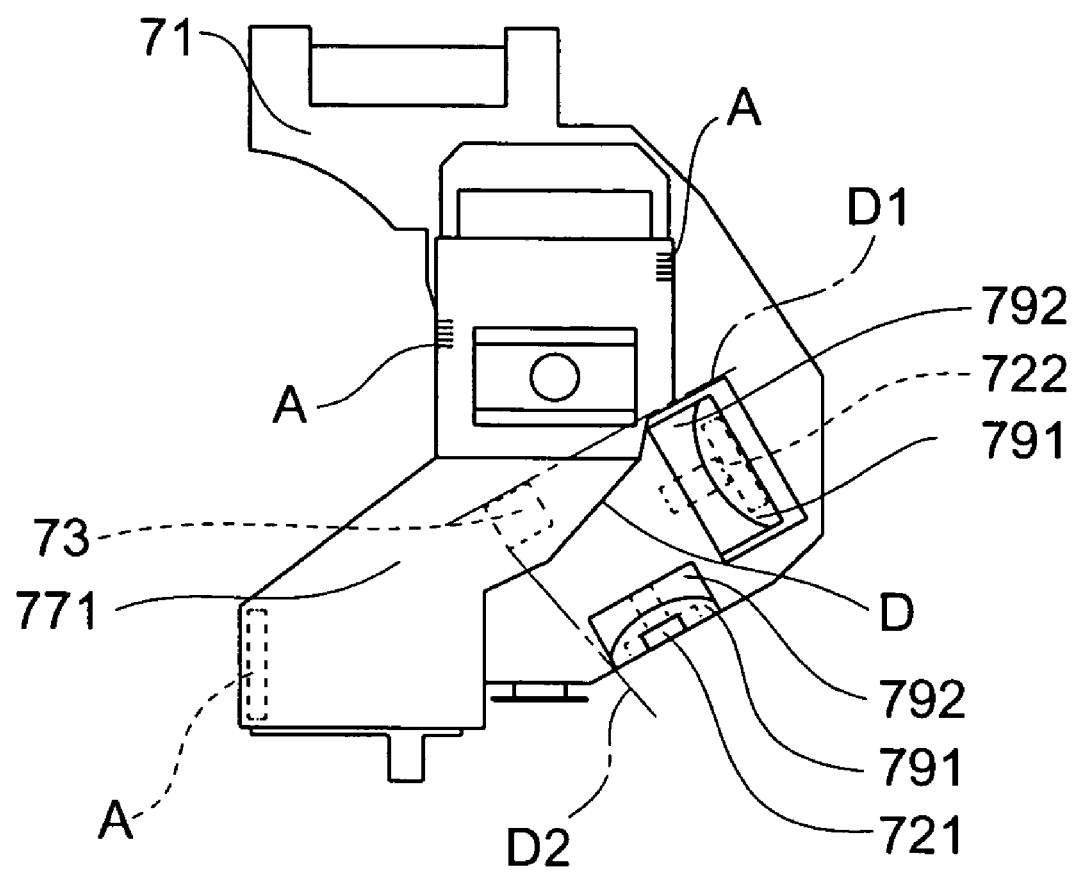
FIG. 5 is a plan view showing the positional relationship among an upper cover fixing portion, the laser driving circuit, and the laser beam sources in the first embodiment.

The upper cover 771, to which the laser driving circuit 73 is connected, is partially connected and mounted to the optical pickup housing 7 as shown in FIG. 5. More specifically, according to the embodiment, connections A of the upper cover 771, to which the laser driving circuit 73 is connected, and the optical pickup housing 7 are not provided in that portion D, which extends between the laser beam sources 721, 722 and the laser driving circuit 73. In FIG. 5, the portion D extends between a line D2, which connects between an end of the first laser beam source 721 farthest from the second laser beam source 722 and an end of the laser driving circuit 73 on the same side as the farthest end is, and a line D1, which connects between an end of the second laser beam source 722 farthest from the first laser beam source 721 and an end of the laser driving circuit 73 on the same side as the farthest end is, so that the connections A are positioned outside the lines D1, D2 as shown in FIG. 5. Thereby, heat generated from the laser driving circuit 73 is prevented from being conducted to the optical pickup housing 71 in the vicinity of the laser beam sources 721, 722 from the upper cover 771 to hinder cooling of the laser beam sources 721, 722, so that the laser beam sources 721, 722 can be restricted to be low in temperature.

Figure 8:
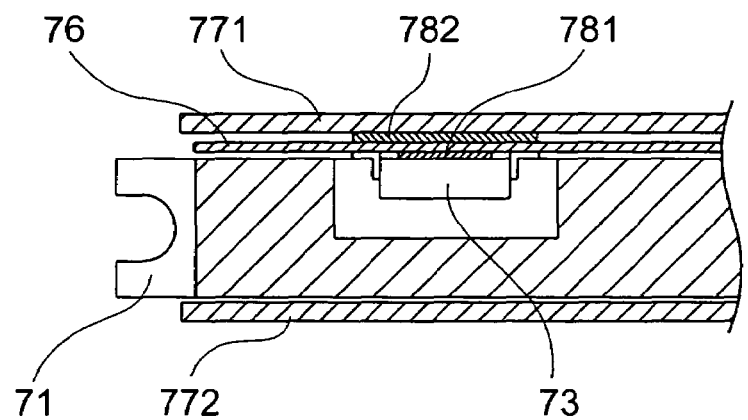
FIG. 8 is a cross sectional view of a portion, to which the laser driving circuit is mounted, in the third embodiment of the invention.

While according to the embodiment, the hole 76a is formed through the flexible substrate 76 as shown in FIG. 4 and the heat conduction member 78 is positioned in the hole 76a to achieve thermal connection of the laser driving circuit 73 and the upper cover 771, a construction shown in FIG. 8 is also possible. According to this second embodiment, opposed surfaces of both the flexible substrate 76 and the upper cover 771 are made conductive surfaces in the case where the flexible substrate 76 is interposed between the laser driving circuit 73 and the upper cover 771. A first thermal conductive member 781 connects between the conductive surface of the laser driving circuit 73 and the conductive surface of the flexible substrate 76, and a second thermal conductive member 782 connects between the flexible substrate 76 and the upper cover 771. The first thermal conductive member 781 is made of a resin material containing a metallic filler, or solder being electrically conductive. The second thermal conductive member is made of a resin material containing a metallic filler, a silicone resin, etc. having a coefficient of thermal conductivity of 1.0 W/m/K or more. Thereby, while heat resistance from the laser driving circuit 73 to the upper cover 771 is restricted to a small magnitude, the first thermal conductive plate 781 can be utilized as an earth wiring for the laser driving circuit 73, so that it is possible to improve the laser driving circuit 73 in electric characteristics.

Figure 9:
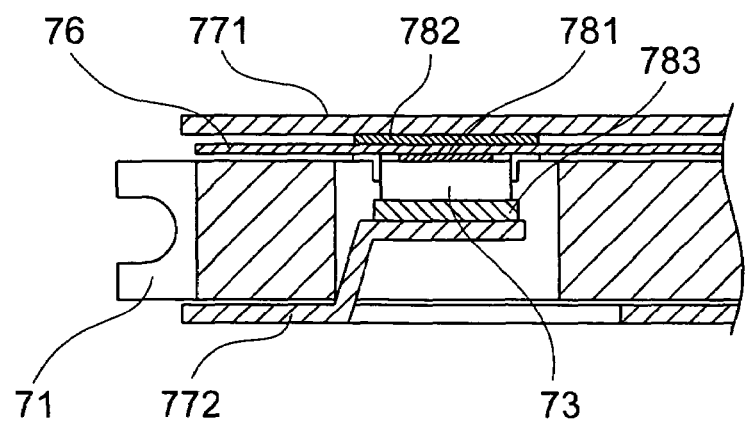
FIG. 9 is a cross sectional view of a portion to which the laser driving circuit is mounted, in the fourth embodiment of the invention.

Further, a construction shown in FIG. 9 is possible. According to this third embodiment, the lower cover 772, which is not connected to the laser driving circuit 73 in FIG. 4, is connected to the laser driving circuit 73 through a third thermal conductive member 783. The third thermal conductive member 783 is made of a resin material containing a metallic filler, a silicone resin, etc. Thereby, heat cooling paths extending from the laser driving circuit 73 can be increased, so that the laser driving circuit 73 can be restricted to be low in temperature.

As described above, according to the invention, the laser beam sources are connected to the optical pickup housing by metallic members and the laser driving circuit is connected to the upper cover or the lower cover without the medium of the optical pickup housing whereby any thermal interference is prevented from occurring between the laser beam sources and the laser driving circuit to hinder cooling of each other. Accordingly, both the laser beam sources and the laser driving circuit are restricted to be low in temperature and heat generating parts can be prevented from undergoing degradation in performance, deterioration in service life, and malfunction, so that it is possible to provide a high-grade optical pickup apparatus, which is enhanced in reliability.

According to the invention, since two opposed surfaces of adjoining fixing members are formed to define curved surfaces capable of mutual surface contact with each other, it is possible to provide an optical pickup apparatus having a high accuracy, with which laser beam sources, an optical detector, and optical parts are adjusted to fixed positions, and a high degree of freedom in directions, in which respective parts are adjusted.

According to the invention, it is possible to provide an optical pickup apparatus, which can prevent laser beam sources and a laser driving circuit from undergoing degradation in performance, deterioration in service life, and malfunction due to generation of heat, and which is high in reliability.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical pickup apparatus including at least one laser beam source, supported on a pickup housing, to emit laser beam for recording and/or reproducing information on a disk being a recording medium, wherein there are provided a plurality of fixing members to fix the at least one laser beam source to the pickup housing, two opposed surfaces of adjoining fixing members among the plurality of fixing members being formed to define curved surfaces capable of mutual surface contact with each other, wherein one of the curved surfaces is formed to provide a cylindrical-shaped side surface and the other of the curved surfaces is formed to provide a concave-shaped surface, which comes into surface contact with the cylindrical-shaped side surface in order to limit rotation to about one axis.

2. An optical pickup apparatus according to claim 1, wherein a plurality of laser beam sources are provided.

* * * * *